United States Patent

[11] 3,573,624

[72] Inventors Jon P. Hartmann
Santa Ana;
Gerald N. Yutzi, San Clemente, Calif.

[21] Appl. No. 739,555
[22] Filed June 24, 1968
[45] Patented Apr. 6, 1971
[73] Assignee North American Rockwell Corporation

[54] IMPULSE RESPONSE CORRECTION SYSTEM
14 Claims, 5 Drawing Figs.

[52] U.S. Cl. .......... 325/42, 178/88, 325/321, 333/17
[51] Int. Cl. .......... H04b 1/10, H04b 1/12
[50] Field of Search .......... 325/42, 41, 321, 323; 178/88, 69; 328/162, 163, 164; 333/17, 18

[56] References Cited
UNITED STATES PATENTS
3,388,330 6/1968 Kretzmer .......... 325/42
3,508,153 4/1970 Gerrish et al. .......... 325/42

*Primary Examiner*—Robert L. Richardson
*Attorney*—L. Lee Humphries

ABSTRACT: A system for determining the impulse response of a transmission channel over which a plurality of consecutive data symbols are transmitted and for compensating the received signals therefor, in which the calculated values of the previously received data symbols modified by the estimated value of the impulse response are subtracted from each signal received over the transmission channel to derive a corrected signal from which the value of the most recently received data symbol may be calculated. The calculated value of the most recently received data symbol modified by the estimated value of the impulse response is then subtracted from the corrected signal to derive a residual which is a function of the difference between the actual and estimated values of the impulse response. The estimated value of the impulse response is then selectively modified so as to minimize the residual.

INVENTORS
JON P. HARTMANN
GERALD N. YUTZI
BY
Philip M. Hinderstein
ATTORNEY

INVENTOR.
JON P. HARTMANN
GERALD N. YUTZI
BY
ATTORNEY

INVENTORS
JON P. HARTMANN
GERALD N. YUTZI
BY
Philip M. Hinderstein
ATTORNEY

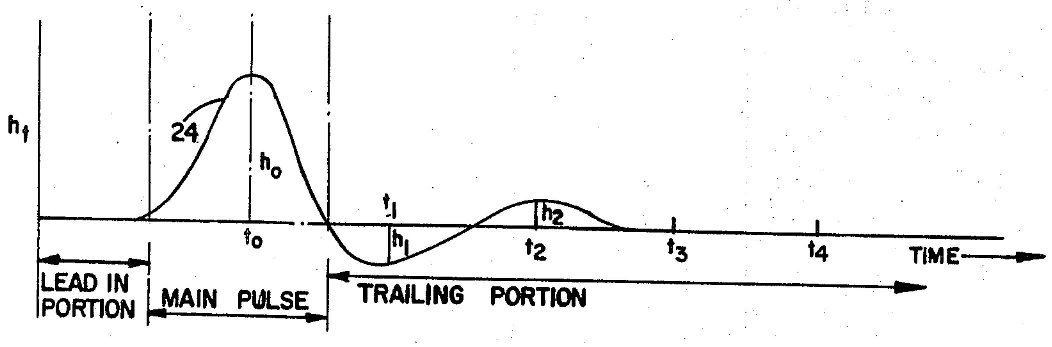

FIG. 3

| | FRAME | SECTION M | SECTION N | SECTION G | OPERATION PERFORMED |
|---|---|---|---|---|---|
| | | | | | $x_i$ to accumulator |
| i th EQUALIZATION CYCLE | 0 | $\bar{d}_{i-2}$ | $\bar{d}_{i-1}$ | $\bar{h}_1$ | $-\bar{d}_{i-1}\bar{h}_1$ to accumulator |
| | 1 | $\bar{d}_{i-3}$ | $\bar{d}_{i-2}$ | $\bar{h}_2$ | $-\bar{d}_{i-2}\bar{h}_2$ to accumulator |
| | 2 | $\bar{d}_{i-4}$ | $\bar{d}_{i-3}$ | $\bar{h}_3$ | $-\bar{d}_{i-3}\bar{h}_3$ to accumulator |
| | 3 | $\bar{d}_{i-5}$ | $\bar{d}_{i-4}$ | $\bar{h}_4$ | $-\bar{d}_{i-4}\bar{h}_4$ to accumulator |
| | 4 | $\bar{d}_{i-6}$ | $\bar{d}_{i-5}$ | $\bar{h}_5$ | $-\bar{d}_{i-5}\bar{h}_5$ to accumulator |
| | 5 | $\bar{d}_{i-7}$ | $\bar{d}_{i-6}$ | $\bar{h}_6$ | $-\bar{d}_{i-6}\bar{h}_6$ to accumulator |
| | 6 | $\bar{d}_{i-1}$ | $\bar{d}_{i-7}$ | $\bar{h}_o$ | slicing (to get $\bar{d}_i$) |
| | 7 | $\bar{d}_{i-1}$ | $\bar{d}_i$ | $\bar{h}_o$ | $-\bar{d}_i\bar{h}_o$ to accumulator (to get $R_i$) |
| i+1 EQUALIZATION CYCLE | 0 | $\bar{d}_{i-2}$ | $\bar{d}_{i-1}$ | $\bar{h}_1$ | $-\bar{d}_{i-1}\bar{h}_1$ to accumulator |

FIG. 5

INVENTOR.
JON P. HARTMANN
GERALD N. YUTZI
BY
[signature]
ATTORNEY

IMPULSE RESPONSE CORRECTION SYSTEM

BACKGROUND OF THE INVENTION

1. Field of the Invention

The present invention relates to a system for correcting distortion of digital data sent over a transmission channel and, more particularly, to a digital, impulse response correction system which adaptively determines the impulse response of the transmission channel and derives therefrom a correction signal which, when combined with the signal being received, permits recovery of the transmitted data in an essentially undistorted form.

2. Description of the Prior Art

Over the years, vast sums of money have been expended in providing telephone transmission equipment which was originally designed for the transmission of information via the spoken word. However, in recent years, because of the enormous increase in the requirement for transmission of digital data and because of the large investment in industry telephone facilities, it has been necessary to develop systems which will enable data to be sent over these existing voice transmission lines. To accomplish the adaptation of telephone lines to digital data transmission, a number of problems have had to be overcome. Variations in gain at different frequencies, i.e. amplitude distortion, and variations in the speed at which different frequencies pass through the line, i.e. delay distortion, as well as variations in these characteristics as lines are switched, cause distortions in the received data waveforms and, although the amplitude and delay distortion does not significantly impair the intelligibility of voice signals transmitted over the line, it does cause smearing of digital signals transmitted on the line and intersymbol interference due to echoes which vary with the line. The resulting confusion makes very high-speed data transmission impossible without compensation.

Furthermore, not only does the delay and amplitude distortion increase the sensitivity of the data transmission to noise, but it frequently leads to errors even in the absence of noise. This is especially true when the data rate is increased towards the Nyquist rate (a rate in bits per second numerically equal to twice the available bandwidth in cycles per second). In practice, the Nyquist rate has rarely been approached or exceeded except under idealized laboratory conditions. As a result, delay and amplitude distortion must be compensated for not only to decrease error rate but to make more efficient use of the channel by transmitting at a higher data rate in a given bandwidth.

In the past, a number of techniques have been used to correct for this transmission path distortion of digital data. For example, if the characteristics of the transmission line are known, it is possible to accomplish equalization by predistortion. That is, the signal to be transmitted itself is distorted in a way such that the additional line distortion alters the predistorted signal to produce a received signal having the desired wave shape. Clearly, use of this technique is limited to those situations where the wave characteristics of the line are constant and known.

Another current practice in the telephone industry is to add to the telephone line attenuation and phase equalization networks and manually adjust these to correct for the amplitude and delay distortion. However, adjustments are tedious and specially trained personnel as well as expensive test equipment are required for making them. New adjustments are required for every new line and the equipment cannot adapt itself to changes in the transmission characteristics of the line.

In a typical situation, the impulse response characteristics of the transmission line in use is not only unknown but, moreover, changes with time. Prior art transmission systems designed to compensate for such unknown characteristics include the use of equalization networks at the receiving end. These networks function to insert additional delay into the transmission path at those frequencies which experience minimum delay over the transmission line itself. That is, the signal components which are received first are delayed by the equalization network for a time corresponding to the delay time of the remainder of the frequencies transmitted by the line. Such equalization systems, while widely used, suffer the considerable disadvantage that they must be adjusted each time a change in line delay characteristics occurs. The adjustments are tedious, time consuming, and normally must be performed manually.

Another technique to correct for delay distortion on a transmission line involves the use of transversal filters. A transversal filter comprises a tapped delay line and a plurality of multipliers, each associated with a single tap of the delay line. The multipliers adjust the amplitude and polarity of the signal obtained from the delay line at the corresponding tap. The outputs of these multipliers then are summed to provide the transversal filter output. By appropriate selection of the tap intervals and the multiplication factors associated with each of the taps, the filter may be used to accomplish intersymbol cancellation. That is, by selecting the amplitude characteristics of the multipliers to correspond to the impulse response characteristics of the transmission line, the filter effectively eliminates the ring-out associated with a digital pulse transmitted over the line. Optimally, however, the transversal filter should be adjusted to correspond to the impulse response of the line, and this too requires either tedious manual adjustment or complicated circuitry. While a compromise adjustment can be made which will minimize the total distortion interference for lines having a range of impulse response characteristics, this is generally not as satisfactory as adjustment to compensate for the particular line.

In addition, transversal filters are limited in that, unless adjusted to match the particular line, they do not completely compensate for the distortion of the signal. Generally, such filters are not adapted to changes in characteristics of the line. Further, such transversal filters suffer the considerable disadvantage that they are not a digital device but rather require the use of an analog delay line. While attempts have been made to digitize such transversal filters, this requires the use of complex pulse code modulation techniques and considerable circuitry. Moreover, the delay of the transversal filter optimally must be considerably longer than the ring-out of the impulse response. Further, the filter may decrease the signal to noise ratio of the system, due to addition of the noise components at each of the taps.

A considerable advance in the state of the art is disclosed in U.S. Pat. No. 3,524,169, issued Aug. 11, 1970 entitled "Impulse Response Correction System" by Gerald K. McAuliffe and David M. Motley and assigned to North American Rockwell Corporation, the assignee of the present application. In that patent there is described a system for adaptively determining the impulse response of a transmission channel to derive therefrom a correction signal which, when combined with the signal being received, permits recovery of the transmitted data in essentially undistorted form. This is done by storing previously received data bits and cross-correlating these stored bits with the signal being received, thereby obtaining the impulse response of the transmission channel. Cross-correlation is achieved by digitally multiplying each of the *n* most recently received data bits by the sampled received signal and integrating the products over time. A correction signal is then derived by digitally multiplying the measured impulse response values by the stored data and summing the products. This correction signal, when combined with the signal received from the channel, allows recovery of the digital signal in essentially undistorted form.

While the above-mentioned patent discloses a system which is effective to adaptively correct distortion of digital data sent over a transmission channel, it has the inherent disadvantage that the process of computing the equalizer settings or the impulse response is done in analog circuitry which includes linear integrators, capacitors, etc. Because of the presence of such analog circuitry, the system is not inherently very stable due to long term aging of the circuitry and/or drift due to temperature variations. This instability has the effect of limiting the data transmission rate.

SUMMARY OF THE INVENTION

According to the present invention there is provided a system for correcting distortion of digital data sent over a transmission channel. The present system adaptively determines the impulse response of the channel and derives, from the measured impulse characteristics, a correction signal. This correction signal, when combined with the signal received from the channel, allows recovery of the digital signal in essentially undistorted form. The present system is inherently accurate and stable because it is implemented entirely from digital components. As a result, the present system is especially amenable to microminiaturization and particularly to implementation with metal oxide silicon (MOS) large scale integrated microcircuits.

The apparatus of the present invention is adaptive in that it continuously learns and compensates for variations in the impulse response of the transmission channel. Further, the present system requires no manual setup or adjustment and hence can be operated essentially unattended. Also, because the impulse response is completely determined at the receiving terminal, a feedback channel is not required. The system may be employed with quadrature and/or multilevel modulation systems which facilitate the transmission of more than one data bit at a time. Cross-channel distortion, which may be present in such a system, is also corrected adaptively by the present system. When employed, the present impulse response correction system permits transmission of digital data over a voice transmission line at rates either above or below the Nyquist rate for that line.

The present impulse response correction system determines the impulse response of the transmission channel in use by means of a technique based upon a numerical method for solving simultaneous linear equations. The measured impulse response is then used to derive a correction signal which, when combined with the received signal, allows recovery of the transmitted data in essentially undistorted form.

The present method of solving simultaneous equations involves the computation of a residual for each new data pulse processed by the equalizer along with an adjustment of the stored impulse response characteristics of the channel to minimize the residual. When the impulse response of the channel is correctly determined and if the previous data pulses are correct, then the residual should be zero. Typically, however, the residuals are not zero. Therefore, adjustment of the impulse response is accomplished by either adding or subtracting a fixed increment to or from the stored impulse response each time a data pulse is processed and a residual computed. In this manner, the impulse response is made to continuously track telephone channel variations during normal data transmission and without special equalization test patterns.

It is, therefore, an object of the present invention to provide a system for determining adaptively the impulse response of a transmission channel.

It is a further object of the present invention to provide a system for correcting for distortion of digital data transmitted over a transmission path.

It is a still further object of the present invention to provide a system for learning adaptively the impulse response of a transmission channel and for providing a distortion correction signal derived from the measured impulse response.

It is another object of the present invention to provide a system for determining the impulse response of a transmission path which is implemented entirely with digital logic and digital storage components.

It is still another object of the present invention to provide an impulse response correction system which automatically adjusts itself to level variations in the line and consequently needs no special AGC circuits.

Another object of the present invention is the provision of a system for correcting for distortion of digital data transmitted over a transmission path in which the channel impulse response factors and data symbols are stored in digital shift registers rather than in analog delay lines and storage capacitors so that performance is not degraded by temperature and power supply voltage fluctuations and component aging.

Still other objects, features and attendant advantages of the present invention will become apparent to those skilled in the art from a reading of the following detailed description of the preferred embodiment constructed in accordance therewith taken in conjunction with the accompanying drawings wherein like numerals designate like parts in the several figures and wherein:

BRIEF DESCRIPTION OF THE DRAWINGS

FIG. 3 is a graph showing a typical impulse response of a transmission path such as that shown in FIG. 1;

FIG. 5 is a table showing the sequence of operations of the system of FIG. 4.

DESCRIPTION OF THE PREFERRED EMBODIMENT

The present system accepts a signal from a transmission channel, which signal contains the digital data as originally transmitted but in a form which is distorted due to the impulse response of the channel. The present system examines this received signal and determines digitally the impulse response of the associated transmission channel. A correction signal is then generated which, when combined with the received signal, allows recovery of the transmitted digital data in essentially undistorted form. The system is adaptive; that is, changes in the impulse response characteristics of the transmission channel are continuously sensed and compensated for.

Figure 1:
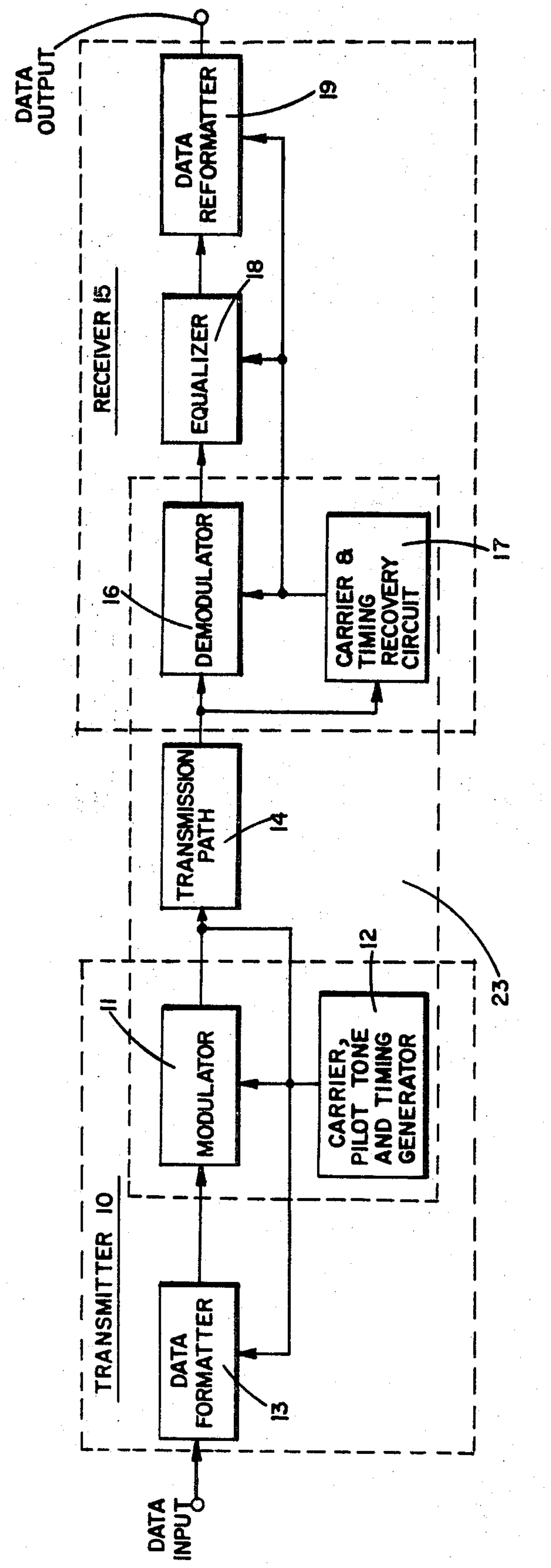
FIG. 1 is a simplified block diagram of a typical data transmission channel in which the present system may be used.

Referring now to the drawings and, more particularly, to FIG. 1 thereof, there is shown the overall transmitter receiver block diagram of the present invention. Since telephone lines are normally incapable of passing direct current information signals, systems intend for use with standard voice bandwidth telephone lines must include some modulating process. In the present case, a transmitter 10 includes a modulator 11 which receives, as a first input, signals from a carrier, pilot tone and timing generator 12. Typically, modulator 11 produces an audiofrequency output which is modulated either in amplitude, frequency or phase by the input data received from a formatter 13 whose input is connected to the data input and whose output is connected to another input of modulator 11. Data formatter 13 is provided for suitably formatting the input data, as will be explained more fully hereinafter. According to the present invention, suppressed carrier double-sideband amplitude modulation is used with pilot tones included in the transmitted signal for recovery of carrier and timing at the receiver for demodulation of the transmitted signal from the telephone line.

The output of modulator 11 is carried by a transmission path 14 to a distant location where it is received by a receiver 15. Receiver 15 includes a demodulator 16, a carrier and timing recovery circuit 17, an equalizer 18 which receives inputs from demodulator 16 and circuit 17 for cancelling the intersymbol interference, and a data reformatter 19 which receives the output of equalizer 18 and which transforms the data from equalizer 18 back into the format it had before processing by transmitter 10.

The output of demodulator 16 contains the input data in a form distorted due to the overall impulse response characteristics $h_t$ of the channel contained within the dotted line area 23 of FIG. 1, that is, the channel which includes modulator 11, transmission path 14 and demodulator 16. This is the channel the equalizer actually equalizes; it does not directly equalize transmission path 14.

In a particular system, the signal distortion characteristics of modulator 11 and demodulator 16 may be known and thus readily compensated for. On the other hand, the distortion characteristics of typical transmission path 14 may be unknown and may change with time. Should transmission path 14 include a telephone line, severe amplitude and delay distortion will be introduced into the transmission path.

Figure 2A:
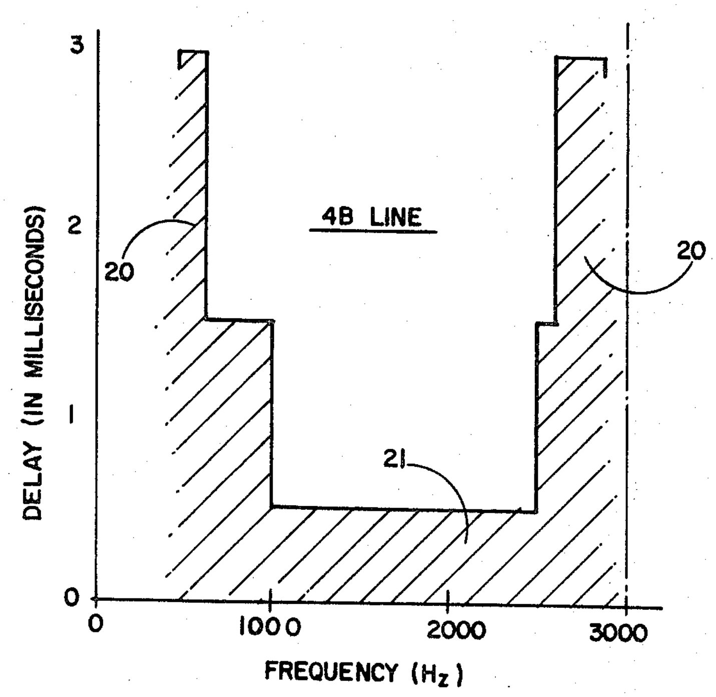
FIGS. 2*a* and 2*b* are graphs showing typical delay characteristics of two classes of commercial telephone lines.
Figure 2B:
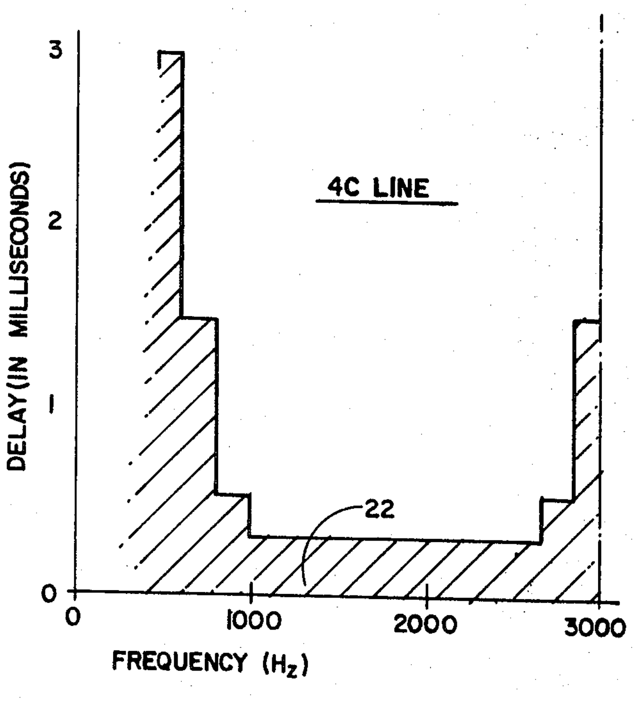

For example, class 4B or 4C commercial telephone transmission lines, which were designed primarily for voice transmission, have delay characteristics shown graphically in FIGS. 2*a* and 2*b*, respectively. As illustrated by shaded regions 20 in FIG. 3*a*, a class 4B line may exhibit as much as 3 milliseconds delay for signal components below 500 Hz. and above 2,800 Hz., while the same class 4B line may have a delay of less than 500 microseconds between 1,000 Hz. and 2,600 Hz., as illustrated by shaded region 21. Similarly, a class 4C line may exhibit a delay of less than 300 microseconds at frequencies between 1,000 Hz. and 2,600 Hz., as illustrated by shaded region 22, while exhibiting longer delay times at other frequencies. These delay characteristics result in considerable distortion of a modulated digital signal transmitted over such a telephone line. In fact, it is this delay distortion which in the past has caused most of the difficulty in facilitating high-speed data transmission.

The present disclosure describes only the equalizer portion 18 of the complete system for transmitting digital data over a telephone line. Thus, the modulation and demodulation techniques and the method of carrier and timing recovery at receiver 15 are not described since these aspects have been adequately treated in the prior art. See, for example, the before-mentioned U.S. Pat. No. 3,524,169.

Referring now to FIG. 3, the overall impulse response $h_t$ of a typical transmission channel is suggested by curve 24. Fundamental to the correct operation of the present decision feedback principle of intersymbol interference cancellation is the characteristic of telephone lines that with proper prefiltering and the use of double-sideband modulation, the majority of the energy of impulse response curve 24 is contained in the main pulse and the following or trailing transients and there is negligible energy in the initial or lead-in transient. This characteristic of the impulse response has been confirmed with measurements of various telephone channels including channels containing telephone lines that are both within and outside the delay and amplitude versus frequency distortion limits of the Bell system schedule 4B specifications. Note that curve 24 reaches a positive maxima $h_o$ at a time $t_o$ and contains trailing components which may be negative or positive in value. The amplitudes of curve 24 at succeeding data transmission times $t_1$, $t_2$, etc. are represented by the values $h_1$, $h_2$, etc.

If consecutive data bits are fed to transmission channel 23 at a sufficiently slow rate, the received signal would consist of consecutive bursts, each having the general appearance of curve 24. In such instances, very little distortion of the signal will occur due to ringing associated with the previously received pulses. Such a system would allow essentially error-free data transmission, but would suffer from the serious inconvenience that the minimum time between succeeding data bits must correspond to the period of ring-out of impulse response curve 24. Obviously, this provides a severe handicap not compatible with the high data transmission speeds required today.

Typically, the timing between successive data bits may be considerably less than the total ring-out time of impulse response curve 24. When such consecutive input data bits are fed to transmission channel 23, the resultant received signal corresponds to the superposition of the individual impulse response curves due to successively transmitted data bits. It is evident that a typical received signal exhibits considerable distortion due to the ring-out of the impulse response curves associated with transmission of the preceding data pulses. Because the predominant energy of the impulse response is in the main pulse and trailing portion, it follows that the major intersymbol interference is caused by the previously transmitted data symbols. The present decision feedback principle eliminates from each sample of the demodulated signal all intersymbol interference caused by the immediately preceding data symbols. Therefore, the present technique is useful in all telephone circuits that would be used for high-speed data transmission.

The present interference cancellation technique operates by subtracting from a data pulse the trailing portions of preceding data pulses. This operation can most easily be understood by a mathematical development in which a sample of the demodulated signal sampled from demodulator 16 and containing intersymbol interference is represented as:

$$x_i = {}_i h_0 + d_{i111} + d_{i12} h_2 + d_{i133} + \ldots \qquad (1)$$

where $x_i$ is the currently sampled value of the demodulated signal, $h_0 h_1$, $h_2$, ... are values of the channel impulse response (see FIG. 3); and $d_i$, $d_{i11}$, $d_{i12}$, ... are quantities representing the last data symbol transmitted ($d_i$) and the successive preceding data symbols transmitted ($d_{i1}$, $d_{i12}$, $d_{i13}$, ...). In a preferred embodiment, the sampling of $x_i$ is made synchronous with the generation of data symbols at transmitter 10 so that a new sample of $x_i$ is made at receiver 15 for each new data symbol transmitted, and the sampling time for $x_i$ is adjusted so that it is sampled at or near the peak of the main pulse of the impulse response thus causing $h_0$ to be maximum. Techniques for doing this are well known in the art.

The present method of interference cancellation follows from equation (1). For each sample of $x_i$, a corrected value, $x_{ic}$, is computed from the equation:

$$x_{ic} = x_i - \bar{d}_{i11} \bar{h}_1 - \bar{d}_{i12} \bar{h}_2 - {}_{i13} \bar{h}_3 - \ldots \qquad (2)$$

in which $\bar{h}_1$, 1, $\bar{h}_2$, $\bar{h}_3$, , ... represent values of the channel impulse response determined and stored in the present equalizer, and $\bar{d}_{i11}$, $\bar{d}_{i12}$, $\bar{d}_{i13}$, ... are data symbols previously transmitted and detected from previous computations of $x_{ic}$. The bars above the $h_a$ and $d_{i,a}$ factors in equation (2) indicate that they are estimated values which are subject to noise and distortion from transmission path 14. In actual implementation of equation (2), it is necessary to subtract only five or six terms since after this number, the impulse response has decayed to a negligible value for the majority of telephone channels.

From equation (2) it is apparent that if the $\bar{h}_a$ factors are correctly determined and the previous data symbols $\bar{d}_{i,a}$ correctly detected, then the intersymbol interference terms in equation (1) are exactly canceled and only the $d_i h_o$ term remains from which the currently received data symbol can be detected. However, because of noise in the transmission channel and the inability to determine the $\bar{h}_a$ factors exactly, an error component $\delta$ is present, so that $x_{ic}$ may be written as:

$$x_{ic} = d_i h_o + \delta. \qquad (3)$$

According to the present invention, the $\bar{h}_a$ factors may be obtained from the solution of a set of simultaneous linear equations. The set of equations can be developed from successive data samples as follows. The current data sample is defined by equation (1). Subsequent samples can be defined as follows:

$$x_i = {}_i h_0 + d_{i111} + d_{i12} h_2 + d_{i1312} h_3 + \ldots \qquad (4)$$

$$x_{i+2} = d_{i+2} h_{ho} + d_{i+1} h_1 + d_i h_2 + {}_{i1,} h_3 + \ldots \qquad (5)$$

$$x_{i+3} = d_{i+3} h_o + d_{i+2} h_2 + d_{i+1} h_1 + d_{i3} + \ldots \qquad (6)$$

If the successive sampled values of the demodulated signal $x_i$, $x_{i+1}$, $x_{i+2}$, ... are available in the receiver and if the successive data symbols $d_{i1a}$, ... $d_i$, ... $d_{i+a}$, are also available, then a set of simultaneous linear equations can be set up in which the $h_a$ a factors are unknowns. By solving these equations, the $h_a$ factors may be determined and used in accordance with equation (2).

According to the present invention, a method of iteratively solving simultaneous equations is used to determine the $\bar{h}_a$ factors. The present method, broadly speaking, involves the computation of a "residual" for each new sample of $x_i$ processed by equalizer 18 along with an adjustment of one of the $\bar{h}_a$ factors to minimize the residual. A residual ($R_i$) is computed from the equation, $$R_i = x_{ic} - \bar{d}_i \bar{h}_o \qquad (7)$$

which, if expanded by substituting equation (2) for $x_{ic}$, becomes, $$R_i = x_i - \bar{d}_i \bar{h}_o - \bar{d}_{i11} \bar{h}_1 - \bar{d}_{i12} \bar{h}_2 - \qquad (8)$$

From equation (4) it is apparent that when the $\bar{h}_a$ factors are correctly adjusted to duplicate the corresponding $h_a$ factors for transmission channel 23 and if the $\bar{d}_i$ factors are correct, then the residual are zero. Typically, however, the residuals are not zero.

Adjustment of the $\bar{h}_a$ factors to minimize the residual is accomplished by either adding or subtracting a fixed increment ($\Delta h$) to one of the $\bar{h}_a$ factors each time a new data pulse is processed through equalizer 18. The adjustment cycle may begin with $\bar{h}_o$, continue sequentially through all of the $\bar{h}_a$ factors, and then repeat. The $\Delta h$ increment is added to or subtracted from a particular $\bar{h}_a$ factor according to the logic relation given in truth table 1, which can be shown to cause the residuals to be reduced.

TRUTH TABLE 1

| | Sign of residual | Sign of $d_i$ associated with h factor being adjusted |
|---|---|---|
| Add $\Delta$ h | + | − |
| | − | + |
| Subtract $\Delta$ h | + | + |
| | − | − |

Since the adjustment cycle for the $\bar{h}_a$ factors is repeated continuously during normal data transmission, the equalizer continuously tracks telephone line variations without the necessity of interrupting the data to transmit special equalization test patterns.

Equalizer 18 will now be described in detail with respect to a single channel system using suppressed carrier, double-sideband, amplitude modulation for transmitting data. However, it will be apparent to those skilled in the art that equalizer 18 may be configured to process two channels simultaneously in which the data to be transmitted is split and modulated onto inphase and quadrature carriers in order to achieve maximum data rate. The manner in which this may be done and the present equalizer extended so as to be capable of eliminating not only the normal intersymbol interference but the cross-channel intersymbol interference follows directly from the discussion in said U.S. Pat. No. 3,524,169.

In the simplest form, the input data to be sent over transmission channel 23 may be accepted either in nonreturn-to-zero form or in pulse form. However, in order to increase the data rate, multilevel amplitude encoding of the data to be transmitted may be used. For example, a uniform symbol transmission rate such as 1,200 symbols per second may be used and the bit transmission rate varied by varying the number of levels in a multilevel amplitude encoding system. For example, in a single channel system having a rate of 1,200 bits per second, there would be two levels per symbol. To transmit at a rate of 2,400 bits per second, four levels per symbol would be required, at 3,600 bits per second, eight levels per symbol are required, and at 4,800 bits per second, 16 levels per symbol are required. In other words, at the 4,800 bit per second rate, for example, four consecutive data bits would be grouped together and converted by data formatter 13 into a signal having one of 16 levels which uniquely defines the four data bits. This 16 level signal is then modulated on a carrier by modulator 11 and transmitted over transmission path 14. The characteristics of the multilevel amplitude encoding are shown in table 2.

TABLE 2

| Data rate | Bits per symbol | Number of symbol amplitude levels | Symbol amplitude representation equations |
|---|---|---|---|
| 4800 | 4 | 16 | $8d_i^{(4)}+4d_.^{(3)}+2d_i^{(2)}+d_i^{(1)}$ |
| 3600 | 3 | 8 | $8d_i^{(4)}+4d_i^{(3)}+2d_i^{(2)}$ |
| 2400 | 2 | 4 | $8d_i^{(4)}+4d_i^{(2)}$ |
| 1200 | 1 | 2 | $8d_i^{(4)}$ |

Either 16, eight, four or two amplitude levels per symbol are used depending on the data rate. The relations between data rate, data bits encoded per symbol, and the number of symbol amplitude levels are given in the first three columns of table 2. The fourth column of the table contains, for each of the data rates, the equation relating the symbol amplitudes to the sequences or patterns encoded in each symbol. In these equations $d_i^{(4)}$, $d_i^{(3)}$, $d_i^{(2)}$, and $d_i^{(1)}$ represent data bits and have numeric values of plus or minus one.

Figure 4:
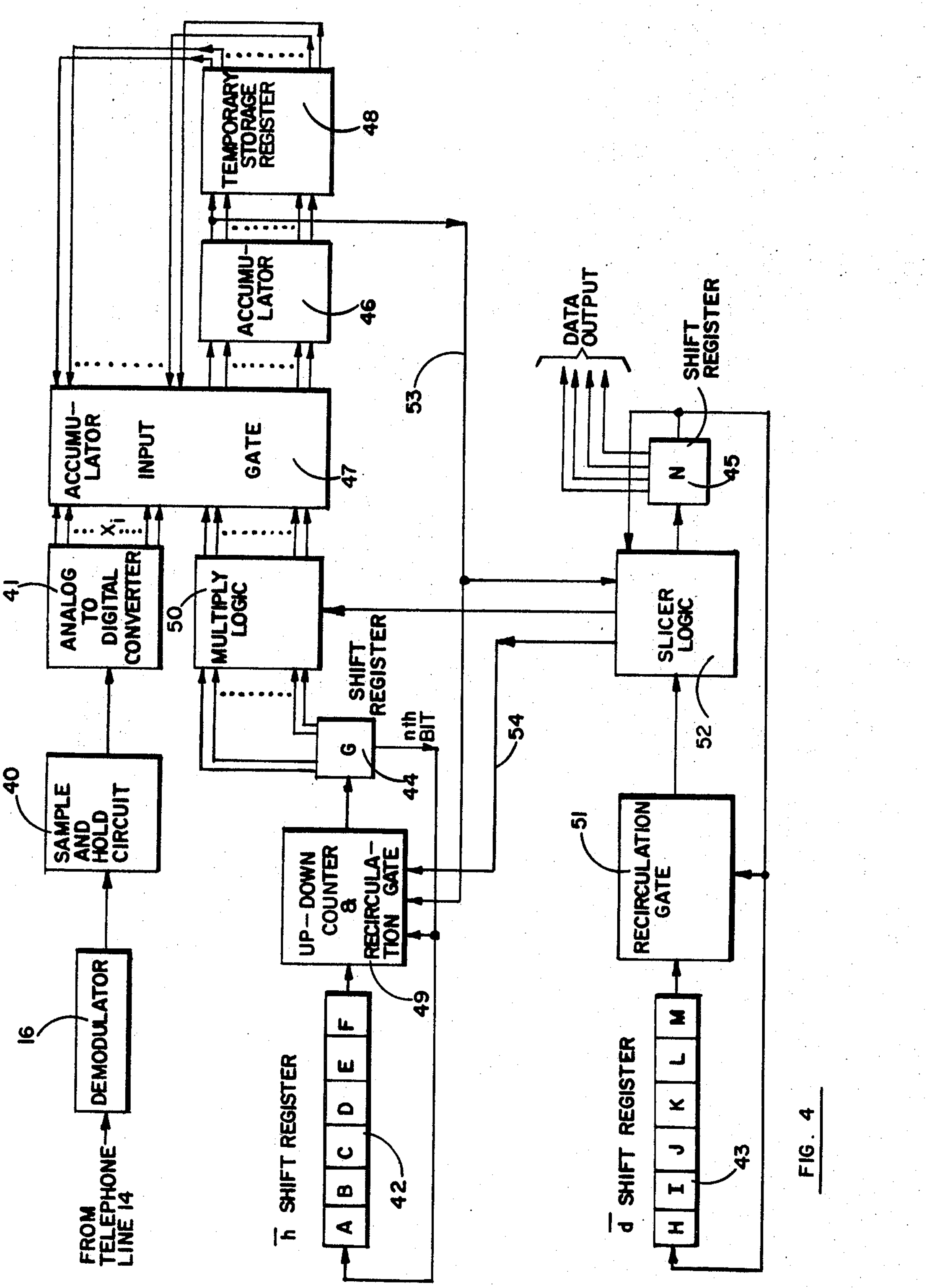
FIG. 4 is a block diagram of a preferred embodiment of the present impulse response correction system.

Referring now to FIG. 4, since the operations of the present equalizer are digitized, signal inputs to the equalizer must also be digitized. Accordingly, the output of demodulator 16 is applied to a sample and hold circuit 40 for holding the sample values of the demodulated data signals during the process of conversion to digital form. For this latter purpose, an analog-to-digital converter 41 is coupled to the output of sample and hold circuit 40 for converting the sampled and held values of the demodulated data signal into digital form. Accordingly, the output of analog-to-digital converter 41 is a multiple bit digital signal equal to $x_i$ in equation (1).

FIG. 4 shows, in block diagram form, the remainder of equalizer 18. A pair of serial, digital shift registers 42 and 43 are provided for storing the $\bar{h}$ and $\bar{d}$ factors, respectively. $\bar{h}$ shift register 42 has a plurality of $r$ of readout sections for storing the individual $\bar{h}_a$ factors, where $r$ is equal to the number of terms subtracted from $x_i$ to get $x_{ic}$ according to equation (2). According to the preferred embodiment, $\bar{h}$ shift register 42 has six readout sections, indicated as A, B, C, D, E AND F. Each of sections A through F is capable of storing $n$ bits of information. Since the $\bar{h}$ factors fluctuate, for reasons to be explained more fully hereinafter, the value of $n$ is chosen so that the fluctuation is small compared to the values of the $\bar{h}$ factors. According to the preferred embodiment, $n=11$.

$\bar{d}$ shift register 43 includes $r=6$ readout sections, indicated as H, I, J, K, L and M, for storing the $\bar{d}_{i1a}$ factors and for carrying out shifting operations. Each of sections H through M in $\bar{d}$ shift register 43 is capable of storing $p$ bits of information where $p$ is equal to the maximum number of data bits encoded in each data symbol. In the present example, $p=4$, the number of data bits encoded in each data symbol at the 4,800 bits per second data rate. An $n+3$bit shift register 44 is also provided for storing $\bar{h}$ factors and is indicated as section G of the $\bar{h}$ shift register. A $p$ bit shift register 45 is also provided for storing $\bar{d}$ factors and is indicated as section N of the $\bar{d}$ shift register.

The output of analog-to-digital converter 41 is applied to an accumulator 46 via an input gate 47. The output of accumulator 46, which is also a multiple bit signal, is applied to a temporary storage register 48, the output of which may be applied back to accumulator 46 via input gate 47. The output of section F of serial shift register 42 is applied to an up-down counter and recirculation gate 49, the output of which is applied to shift register 44. The first $n$ stages of shift register 44 are connected to the input of a multiply logic circuit 50, the output of which is applied to accumulator 46 via input gate 47. The $n^{th}$ stage of shift register 44 is connected to section A of shift register 42 and to up-down counter and recirculation gate 49. The output of section M of shift register 43 is connected via a recirculation gate 51 to a slicer logic circuit 52, an output of which is applied to section N. The output of section N is applied back to slicer logic 52 as well as to section H and recirculation gate 51. An output of slicer logic 52 is also applied to multiply logic 50 and to up-down counter and recirculation gate 49 via a line 54. The sign bit of accumulator 46 is applied to slicer logic 52, via a line 53, as well as to up-down counter and recirculation gate 49. The data output is obtained from shift register 45.

FIG. 5 illustrates the present equalizer timing and sequencing. By way of review, each time a new $x_i$ data pulse is processed, the present equalizer carries out the following operations: (1) computation of $x_{ic}$, (2) slicing of $x_{ic}$ to recover the binary data $\bar{d}_i$, (3) computation of $R_i$, and (4) incrementing or decrementing of one $\bar{h}_a$ factor. For carrying out these operations, the equalization cycle is divided into eight frames. FIG. 5 indicates which operations are performed during each frame. Each frame in turn is divided into $n$=11 clock pulses for shifting the 11-bit $\bar{h}_a$ factors.

The start of the equalization cycle is triggered by a pulse from analog-to-digital converter 41 indicating that the $x_i$ sample has been digitized and transferred to accumulator 46. At the beginning of the equalization cycle, the $\bar{h}$ and $\bar{d}$ factors are positioned in their respective registers as shown in table 3.

TABLE 3

| Section | Data stored therein | Section | Data stored therein |
|---|---|---|---|
| A | $\bar{h}_0$ | H | $\bar{d}_{i-7}$ |
| B | $\bar{h}_6$ | I | $\bar{d}_{i-6}$ |
| C | $\bar{h}_5$ | J | $\bar{d}_{i-5}$ |
| D | $\bar{h}_4$ | K | $\bar{d}_{i-4}$ |
| E | $\bar{h}_3$ | L | $\bar{d}_{i-3}$ |
| F | $\bar{h}_2$ | M | $\bar{d}_{i-2}$ |
| G | $\bar{h}_1$ | N | $\bar{d}_{i-1}$ |

During each frame, either the entire $\bar{h}$ and $\bar{d}$ registers or sections of them are advanced one $\bar{h}$ or $\bar{d}$ factor position, amounting to 11-bit positions for the $\bar{h}$ registers and four-bit positions for the $\bar{d}$ registers, and either intersymbol interference terms are subtracted or slicing takes place as indicated in FIG. 5.

From FIG. 5 it can be seen that during frames 0 through 5, all of the intersymbol interference terms are subtracted from the $x_i$ data pulse initially loaded into accumulator 46 and, during frame 6, $x_{ic}$ is sliced to determine the value of $d_i$.

Because the slicing operation destroys $x_{ic}$ in accumulator 46, it is necessary to hold this value in temporary storage register 48 during slicing and then transfer the value back to accumulator 46 for computation of $R_i$. Accordingly, $x_{ic}$ is transferred from accumulator 46 to temporary storage register 48 during the last clock pulse of frame 5 and is transferred back to the accumulator during the last clock pulse of frame 6, after the slicing operation is completed. With the completion of frame 7, all of the $\bar{d}_{i1a}\bar{h}_a$ terms have been subtracted from accumulator 46 and hence the residual $R_i$ is contained therein. During the last clock pulse of frame 7 the sign of the residual (the most significant bit in accumulator 46) is transferred to up-down counter 49 where it is stored for use in incrementing or decrementing an $\bar{h}_a$ factor during the next equalization cycle.

An example will illustrate how the $\bar{d}_{i1a}\bar{h}_a$ terms are subtracted and how the shift and add operations are sequenced. The example will be for the terms subtracted during frame 0 at the 4,800 bit per second rate. The sequence of the operations for the subtractions during the other frames are identical to the sequence for frame 0. Subtraction at the other data rates will be discussed at the end of the example.

The equations for the terms subtracted during frame 0, based on the 4,800 bit per second, 16 level symbol equations given in table 2 are:

$$\bar{d}_{i-1}\bar{h}_1=\bar{d}^{(4)}_{i-1}(8\bar{h}_1)+d^{(3)}_{i-1}(4\bar{h}_1)+d^{(2)}_{i-1}(2\bar{h}_1)+d^{(1)}_{i-1}(\bar{h}_1) \quad (9)$$

where the $d^{(i)}_{i-1}$ terms are detected data bits having values of plus or minus one. The shift and add operations generate the terms represented by this equation and subtract them from the accumulators as follows. During frame 0, $\bar{h}_1$ is contained in shift register 44 which is connected to multiply logic 50 and during the first clock time of frame 0, all 11 bits of $\bar{h}_1$ are contained in the most significant 11-bit positions of register 44. Since for the shift and add routine, the positioning of the $\bar{h}$ factors within these register sections determines the scale factors associated with them and shifting them right one bit position divides their scale factors by two, a scale factor eight has been assigned when they are contained in the 11 most significant bit positions of shift register 44. Also during the first clock pulse of frame 0, $\bar{d}_{i11}$ is contained in shift register 45 with the $\bar{d}^{(4)}_{i-1}$ term in the last bit position of this section. It is this bit position of register 45 that is connected to multiply logic 50 via slicer logic 52 to furnish data symbol bits for calculation of $\bar{d}_{i1a}\bar{h}_a$ terms.

During the first clock pulse of frame 0, depending on whether $\bar{d}^{(4)}_{i-1}$ is respectively a plus or minus one, $8\bar{h}_1$ either subtracted from or added to accumulator 46. Between the first and second clock pulses of frame 0, the $\bar{h}$ shift registers A through G are shifted one bit position to the right, thereby rescaling $8\bar{h}_1$ to $4\bar{h}_1$. Also, $\bar{d}$ shift register sections H through N are shifted one bit position to the right, making $\bar{d}^{(3)}_{i-1}$ available. Hence, during the second clock pulse, depending on whether $\bar{d}^{(3)}_{i-1}$ is respectively a plus or minus one, $4\bar{h}_1$ is either added to or subtracted from accumulator 46. Subsequently, with $\bar{h}$ and $\bar{d}$ register sections A through G and H through N shifted to the right one bit position with each successive clock pulse, during the third clock pulse of frame 0, $2\bar{h}_1$ is either added to or subtracted from accumulator 46 and during the fourth clock pulse, $\bar{h}_1$ is either added to or subtracted from accumulator 46. For each of the remaining seven clock pulses of frame 0, the $\bar{h}$ register sections A through G are shifted right one bit position so that during the first clock pulse of the next frame, $8\bar{h}_2$ is positioned in section G of the $\bar{h}$ shift register ready for the cancellation of the term $\bar{d}_{i12}\bar{h}_2$. The $\bar{h}_1$ factor is now contained in section A. Also, the four shifts of the $\bar{d}$ register sections H through N, which occur during the first four clock pulses of frame 0, have shifted $\bar{d}_{i12}$ into section N ready for the cancellation of this term. Consequently, no further shifting of the $\bar{d}$ register sections is necessary until the next frame. The $\bar{d}_{i11}$ is now contained in section H.

Multiply logic 50 controls, during the shift and add operations, whether the $\bar{h}_a$ factors in shift register 44 are added to or subtracted from accumulator 46 by inverting or not inverting the signs of the $\bar{h}_a$ factors before they are added to the contents of accumulator 46. The last bit position of shift register 45 is connected through a gate in slicer logic 52 to multiply logic 50 to control the sign inversions. It should now be appreciated that register 44 has $n$+3 or 14 stages to accommodate the 11-bit $\bar{h}$ factors which are shifted three times during the shift and add operations.

For data rates lower than 4800 bits per second, lesser numbers of additions to or subtractions from accumulator 46 are made in each frame since fewer bits are coded into the data symbols for the lower data rates. Specifically, for the 3600 bit per second rate, three additions are made to accumulator 46 with the $\bar{h}_a$ factors scaled to eight, four and two; for the 2,400 bit per second rate, two additions are made with the $\bar{h}_a$ factors scaled to eight and four; and for the 1,200 bit per second rate, one addition is made with the $\bar{h}_a$ factors scaled to eight. These operations follow from the symbol amplitude representation equations for the lower data rates contained in table 2. Eleven shifts of the $\bar{h}$ register sections A through G and four shifts of the $\bar{d}$ register sections H through N are still made in each frame as a 4,800 bits per second, but at 3,600 bits per second, only the first three most significant bits of the $\bar{d}$ factors are used for multiplication, and correspondingly, only the first two bits are used at 2,400 bits per second and only the first bit at 1,200 bit per second.

The procedure continues through frame 5 so that as shown in FIG. 5, at the end of frame 5, all of the terms $\bar{d}_{i11}\bar{h}_1$ through $\bar{d}_{i166}$ have been subtracted from $x_i$ loaded into accumulator 46 by analog-to-digital converter 41. Therefore, at the end of frame 5, accumulator 46 has stored therein the corrected value $x_{ic}$. During frame 6, the value of $x_{ic}$ is sliced by an amount proportional to $\bar{h}_o$, which is now stored in section G, to derive $\bar{d}_i$. For slicing, an operation analogous to successive approximation analog-to-digital conversion is implemented with the same shift and add operations used for computing and subtracting the $\bar{d}_{i1a}\bar{h}_a$ terms. As has been mentioned previously, the slicing comparison levels are derived from $\bar{h}_o$, thus providing automatic gain control.

During frame 6, the bits in section G are recirculated back into this section through the recirculation gates in block 49 and the bits in sections A through F are not shifted. Also during frame 6, as each bit of the new data symbol is generated, it is shifted into section N of the $\bar{d}$ shift register replacing the bits previously stored therein, and the bits in sections H through M are held stationary. In other words, as shown in FIG. 5, at the beginning of frame 6, $\bar{d}_{i17}$ is stored in section N of the $\bar{d}$ shift register and $\bar{h}_o$ is stored in section G of the $\bar{h}$ shift register. However, since $\bar{d}_{i17}$ is not used in calculating $x_{ic}$, during frame 6, as $\bar{d}_i$ is calculated, it is shifted into section N, thereby destroying the value of $\bar{d}_{i17}$.

In order to indicate the sequence of operations which occur during slicing; slicing during frame 6 at the 4,800 bit per second rate will be described. Slicing at the lower rates will be discussed at the end of the description.

During the first clock pulse of frame 6, $\bar{h}_o$ is contained at a scale factor of eight in section G and $\bar{d}_{i17}$ is contained in section N. At the 4,800 bit per second rate, the four bits of the new data symbol $d_i$ are generated during the first four clock pulses of frame 6. The operations that occur during these four clock pulses and the remaining clock pulses of frame 6 are as follows. During the first clock pulse, comparison is made to 0 by examining the sign of $x_{ic}$ (the most significant bit in accumulator 46). For this purpose, the most significant bit of accumulator 46 is connected via line 53 to slicer logic 52. If the sign of $x_{ic}$ is positive, a binary 0 for the most significant bit of $d_i$ is shifted by slicer logic 52 into section N and $8\bar{h}_o$ is subtracted from $x_{ic}$ in accumulator 46. If the sign of $x_{ic}$ is negative, a binary 1 is shifted into section N and $8\bar{h}_o$ is added to $x_{ic}$ in accumulator 46. In addition, section G is shifted right one bit scaling the contents thereof from eight to four. However, in this instance, instead of the output of section G being shifted to section A, it is shifted via recirculation gate 49 back into section G.

During the second clock pulse of frame 6, the operations of the first clock pulse are repeated. That is, the sign bit of accumulator 46, which now contains $x_{ic}\pm8\bar{h}_o$, is examined, and depending upon the sign bit, either a binary 0 or a binary 1 for the second most significant bit of $\bar{d}_i$ is shifted into section N and $4\bar{h}_o$ is either added to or subtracted from $x_{ic}\pm8_1$ in accumulator 46. Again, section G is shifted right one bit, this time scaling the contents thereof from four to two. During the third and fourth clock pulses, the operations of the first clock pulse are again repeated. More particularly, for the third clock pulse, the comparison level is $4\bar{h}_o$, the third most significant bit of $d_i$ is generated, and $2\bar{h}_o$ is either added to or subtracted from accumulator 46. For the fourth clock pulse, the comparison level is $2\bar{h}_o$, the fourth most significant bit is generated, and $\bar{h}_o$ is either added to or subtracted from accumulator 46. During the remaining seven clock pulses of frame 6, no further shifting of section N takes place but the contents of section G are shifted right seven bits so that at the end of frame 6, they are restored to the state they had at the beginning of the frame; i.e., at the end of frame 6, $\bar{h}_o$ is again contained in section G at a scale factor eight ready for the operations of frame 7. In addition $\bar{d}_i$ has now been read into section N of the $\bar{d}$ shift register.

The slicing operation for the lower data rate are the same as those described above for the 4,800 bit second rate, except that although four shift and add operations are sill carried out during each slicing frame, not all of them and hence not all the bits generated, have significance.

Because the slicing operation destroys $x_{ic}$ in accumulator 46, it is necessary to hold it in temporary storage register 48 during slicing and then transfer it back to accumulator 46 for computation of $R_i$. Therefore, in the case of $x_{ic}$, it is transferred from accumulator 46 to temporary storage register 48 during the last clock pulse of frame 5 immediately before slicing. During the last clock pulse of frame 6, after the slicing operation is completed, $x_{ic}$ is transferred back to accumulator 46 via input gate 47. Therefore, at the beginning of the seventh frame, $x_{ic}$ is contained in accumulator 46, $\bar{h}_o$ is contained in section G, and $\bar{d}_i$ is contained in section N. During the first four clock pulses of frame 7, $\bar{h}_o$ is either subtracted from or added to the contents in accumulator 46 depending upon the sign of the $\bar{d}_i$ data bits, in the same manner as described above with respect to the terms $\bar{d}_{i11}\bar{h}_1$ through $\bar{d}_{i16}\bar{h}_6$. This subtraction of $\bar{d}_i\bar{h}_o$ from $x_{ic}$ in accumulator 46 during frame 7 results in the calculation of the residual $R_i$ in accordance with equation (4). With the completion of frame 7, all of the $\bar{d}_{i1a}\bar{h}_a$ terms have been subtracted from accumulator 46 and hence the residual $R_i$ is contained therein. During the last clock pulse of frame 7 the sign of the residual (most significant bit in accumulator 46) is transferred to a storage element in up-down counter and recirculation gate 49 via line 53 for use in incrementing or decrementing an $\bar{h}_a$ factor during the next equalization cycle.

The principle for incrementing or decrementing the $\bar{h}_a$ factors requires, for each equalization cycle, that an $\bar{h}_a$ factor be incremented or decremented, and that for each successive equalization cycle, a different $\bar{h}_a$ factor be incremented or decremented. Consequently, during each equalization cycle, logic functions, derived from counters which are a part of the equalizer timing logic, cause one $\bar{h}_a$ factor to be incremented or decremented as it is shifted serially through up-down counter 49 and cause the remaining $\bar{h}_a$ factors to shift through with no adjustment. For each successive equalization cycle, the logic functions cause the incrementing or decrementing to advance to the next $\bar{h}_a$ factor until all seven of the $\bar{h}_a$ factors have been adjusted. At this point, the cycle is repeated.

The signs of the data symbols and residuals needed for incrementing or decrementing an $\bar{h}_a$ factor are generated during the equalization cycle which immediately precedes the cycle in which they are incremented or decremented. It has already been mentioned that the sign of the residual is transferred to up-down counter 49 at the end of the equalization cycle. Similarly, at the appropriate time during the equalization cycle, the sign of the data symbol relating to the $\bar{h}_a$ factor to be adjusted during the next equalization cycle, is transferred via line 54 to a storage element in up-down counter 49. The sign is transferred from the last bit position of register 45. When both the residual and data symbol signs have been transferred, they may be most simply combined with exclusive OR gates in up-down counter 49 to determine the sense of the $\bar{h}_a$ factor adjustment for each channel in accordance with table 1.

Because of the present technique for sequentially adjusting the $\bar{h}_a$ factors, once convergence is obtained, the $\bar{h}_a$ factors will still fluctuate around their actual values by amounts which may be as large as $\pm4\Delta h$. However, in the present system, incrementing and decrementing is accomplished in units of binary 1. Thus, with an 11-bit binary format for the $\bar{h}_a$ factors, one bit sign and 10 bits magnitude, $\Delta h$ amounts to only 1/1024 thousand twenty four of the maximum magnitude of the $\bar{h}$ factors. Therefore, fluctuation by amounts as large as $\pm4\Delta h$ does not present serious problems.

While the invention has been described with respect to a preferred physical embodiment constructed in accordance therewith, it will be apparent to those skilled in the art that various modifications and improvements may be made without departing from the scope and spirit of the invention. Accordingly, it is to be understood that the invention is not to be limited by the specific illustrative embodiments, but only by the scope of the appended claims.

We claim:

1. In a system wherein a plurality of consecutive data symbols are transmitted over a transmission channel, a method for determining the impulse response of said transmission channel and for compensating the received signals therefor, comprising the steps of:

deriving from successive signals received over said transmission channel a set of simultaneous linear equations in which each successive received signal is set equal to the sum of the most recently received data symbol and the previously received data symbols modified by the estimated value of said impulse response;

solving said set of simultaneous equations for said estimated value of said impulse response;

subtracting from each of said received signals the calculated values of the previously received data symbols modified by the estimated value of said impulse response to derive a corrected signal; and calculating from said corrected signal the value of the most recently received data symbol.

2. The method of claim 1 wherein said step of solving said set of simultaneous equations comprises the steps of:

subtracting from said corrected signal the calculated value of the most recently received data symbol modified by the estimated value of said impulse response to derive a residual, said residual being a function of the difference between the actual and estimated values of said impulse response; and selectively modifying the estimated value of said impulse response so as to minimize said residual.

3. The method of claim 1 wherein the step of calculating the value of the most recently received data symbol comprises the step of comparing said corrected signal with the estimated value of the maximum amplitude of said impulse response.

4. In a system wherein a plurality of consecutive data symbols $d_{i1a}$ are transmitted over a transmission channel, means for determining the impulse response $h_a$ of said transmission channel and for compensating the received signals with successive values of said impulse at intervals equal to that between consecutive data symbols being represented as $h_o$, $h_1$, $h_2$, ... comprising:

summing means for summing together previously received signals according to, $\bar{d}_{i11}\bar{h}_1+\bar{d}_{i12}\bar{h}_2 \ldots$;

means for subtracting from each received signal, $x_i$, the sum of the previously received data symbols, $\bar{d}_{i11}$, $\bar{d}_{i12}$, $\bar{d}_{i13}$, ... modified by the estimated values $\bar{h}_1$, $\bar{h}_2$, $\bar{h}_3$, ... of said impulse response according to the equation:

$$x_{ic}=x_{i}-_{i11}\bar{h}-\bar{d}_{i12}\bar{h}_2-\bar{d}_{i133}-\ldots$$

where $x_{ic}$ is equal to $\bar{d}_i\bar{h}_o+\delta$ where $\delta$ is an error component due to noise and the difference between the actual and estimated values of said impulse response;

means connected to said subtracting means for slicing $x_{ic}$ by $\bar{h}_o$ to derive $\bar{d}_i$, means for subtracting $d_ih_o$ from $x_{ic}$ to derive a residual $R_i$; and means for selectively modifying the estimated value of said impulse response so as to minimize $R_i$.

5. The apparatus of claim 4 wherein said means for selectively modifying the estimated value of said impulse response comprises means for selectively adding or subtracting an increment $\Delta h$ to or from one of said $\bar{h}_a$ factors each time a data symbol is processed.

6. The apparatus of claim 5 wherein a different one of said $\bar{h}_a$ factors is incremented each time a data symbol is processed.

7. The apparatus of claim 4 wherein said means for slicing comprises means for comparing the value of $x_{ic}$ with the estimated value $\bar{h}_o$ to derive $\bar{d}_i$.

8. In a system wherein a plurality of consecutive data symbols $d_{i12}$ are transmitted over a transmission channel, a method for determining the impulse response of said transmission channel and for compensating the received signals therefor, successive values of said impulse response at intervals equal to that between consecutive data symbols being represented as $h_o$, $h_1$, $h_2$,... comprising the steps of:

subtracting from each received signal, $x_1$, the calculated values $\bar{d}_{i11}$, $\bar{d}_{i12}$, $\bar{d}_{i13}$, ... of the previously received data symbols modified by the estimated values $\bar{h}_1$, $\bar{h}_2$, $\bar{h}_3$, ... of said impulse response according to the equation $$x_{ic}=x_{i}-_{i11}\bar{h}-\bar{d}_{i12}\bar{h}_2-\bar{d}_{i133}-\ldots$$

where $x_{ic}$ is equal to $d_ih_o+\delta$ where $\delta$ is an error component due to noise and the difference between the actual and estimated values of said impulse response;

slicing $x_{ic}$ by $h_o$ to derive $\bar{d}_i$, subtracting $\bar{d}_i\bar{h}_o$ from $x_{ic}$ to derive a residual $R_i$; and selectively modifying the estimated value of said impulse response so as to minimize $R_i$.

9. The method of claim 8 wherein said step of selectively modifying the estimated value of said impulse response comprises the step of selectively adding or subtracting an increment $\Delta h$ to or from one of said $\bar{h}_a$ factors each time a data symbol is processed.

10. The method of claim 9 wherein a different one of said $\bar{h}_a$ factors is incremented each time a data symbol is processed.

11. The method of claim 8 wherein the step of slicing $x_{ic}$ to derive $\bar{d}_i$ comprises the step of comparing the value of $x_{ic}$ with the estimated value $\bar{h}_o$ to derive $\bar{d}_i$.

12. In a system wherein a plurality of consecutive data symbols are transmitted over a transmission channel, a method for determining the impulse response of said transmission channel and for compensating the received signals therefor, comprising the steps of:

subtracting from each signal received over said transmission channel the calculated values of the previously received data symbols modified by the estimated value of said impulse response to derive a corrected signal;

calculating from said corrected signal the value of the most recently received data symbol;

subtracting from said corrected signal the calculated value of the most recently received data symbol modified by the estimated value of said impulse response to derive a residual, said residual being a function of the difference between the actual and estimated values of said impulse response; and selectively modifying the estimated value of said impulse response so as to minimize said residual.

13. The method of claim 12 wherein the step of calculating the value of the most recently received data symbol comprises the step of comparing said corrected signal with the estimated value of the maximum amplitude of said impulse response.

14. In a system wherein a plurality of consecutive data symbols are transmitted over a transmission channel, apparatus for determining the impulse response of said channel and for compensating the received signals therefor, comprising in combination;

a. converter means for receiving said transmitted consecutive data symbols and for converting said symbols into digital data form;

b. accumulator means responsive to said digital data signals from said converter means for accumulating successive digital data signals and for subtracting from the sum of previously accumulated digital data signals each recently received data signal to provide a corrected signal;

c. gate means interposed between said accumulator means and said converter means to control the application of a most recently received digital data signal and said previously computed received digital data signals to said accumulator means;

d. a first shift register means for receiving each successive output from said accumulator means and providing as an output, signals proportional to the impulse response of said transmission channel;

e. a second shift register means;

f. a logic means for receiving the corrected signal from said accumulation means and for slicing said corrected digital data signals to recover the bit information in said signals, said determined bit information being fed to said first and said second shift registers to enable said first shift register means to subtract said bit signal from said corrected signal to provide a signal proportional to the impulse response of said channel;

g. multiply logic means for receiving the outputs of said first and said second shift register means for multiplying said outputs together and for applying a correct sign to the products of said outputs so as to provide an output signal which is the sum of previously received digital data signals, to said gate means which sum is subtracted from the most recently processed digital data signal from said converter means to provide a residual signal; and h. means for determining the sign of the residual signal and for adding or subtracting a fixed increment from the signal stored in said first shift register so as to change the sign of said residual signal.